(12) United States Patent
Barwicz

(10) Patent No.: US 11,199,664 B2
(45) Date of Patent: Dec. 14, 2021

(54) FLEXIBLE WAVEGUIDE HAVING AN ASYMMETRIC OPTICAL-LOSS PERFORMANCE CURVE AND IMPROVED WORST-CASE OPTICAL-LOSS PERFORMANCE

(71) Applicant: International Business Machines Corporation, Armonk, NY (US)

(72) Inventor: Tymon Barwicz, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/132,006

(22) Filed: Dec. 23, 2020

(65) Prior Publication Data

US 2021/0109289 A1 Apr. 15, 2021

Related U.S. Application Data

(62) Division of application No. 16/433,005, filed on Jun. 6, 2019, now Pat. No. 10,884,191.

(51) Int. Cl.
*G02B 6/30* (2006.01)
*G02B 6/42* (2006.01)
(Continued)

(52) U.S. Cl.
CPC ............ *G02B 6/30* (2013.01); *G02B 6/03616* (2013.01); *G02B 6/3608* (2013.01); *G02B 6/4292* (2013.01); *G02B 6/3834* (2013.01)

(58) Field of Classification Search
CPC .... G02B 6/30; G02B 6/03616; G02B 6/3608; G02B 6/4292; G02B 6/3834
(Continued)

(56) References Cited

U.S. PATENT DOCUMENTS 6,091,874 A 7/2000 Higashi et al.
6,167,169 A * 12/2000 Brinkman ............... G02F 1/011
385/10
(Continued)

FOREIGN PATENT DOCUMENTS

CN 102495447 A 6/2012

OTHER PUBLICATIONS

Bakir et al., "Low-Loss (<1 dB) and Polarization-Insensitive Edge Fiber Couplers fabricated on 200-mm Silicon-on-Insulator wafers," IEEE Photonics Technology Letters 22.11 (2010): 739-741.
(Continued)

*Primary Examiner* — Jerry M Blevins
(74) *Attorney, Agent, or Firm* — Cantor Colburn LLP; Stosch Sabo

(57) ABSTRACT

Embodiments of the invention are directed a waveguide having a first waveguide segment that includes a set of first waveguide segment confinement parameters; a second waveguide segment having routing bends and a set of second waveguide segment confinement parameters; and a third waveguide segment having a set of third waveguide segment confinement parameters. The waveguide is configured to guide optical data according to an asymmetric optical-loss performance curve that is a plot of the sets of first, second, and third waveguide segment confinement parameters on a first axis; and a level of optical-loss performance that results from the sets of first, second, and third waveguide segment confinement parameters on a second axis. The sets of first, second, and third waveguide segment confinement parameters are configured to, collectively, maximize a predetermined worst-case optical-loss performance level of the asymmetric optical-loss performance curve within a range of waveguide fabrication tolerances.

20 Claims, 15 Drawing Sheets

(51) Int. Cl.
*G02B 6/036* (2006.01)
*G02B 6/36* (2006.01)
*G02B 6/38* (2006.01)

(58) Field of Classification Search
USPC .......................................................... 385/49
See application file for complete search history.

(56) References Cited

U.S. PATENT DOCUMENTS

| | | | |
|---|---|---|---|
| 7,738,753 | B2 | 6/2010 | Assefa et al. |
| 8,534,927 | B1 | 9/2013 | Barwicz et al. |
| 8,724,937 | B2 | 5/2014 | Barwicz et al. |
| 9,274,272 | B2 | 3/2016 | Sandhu et al. |
| 10,025,036 | B2 | 7/2018 | Kobyakov et al. |
| 10,162,118 | B2 | 12/2018 | Testa et al. |
| 10,288,808 | B1 * | 5/2019 | Pitwon .................. G02B 6/1221 |
| 2010/0158445 | A1 | 6/2010 | Kim et al. |
| 2012/0251029 | A1 * | 10/2012 | Kobrinsky .............. G02F 1/065 385/2 |
| 2014/0269800 | A1 * | 9/2014 | Purnawirman ....... H01S 3/1636 372/40 |
| 2015/0010268 | A1 | 1/2015 | Badihi et al. |
| 2018/0031946 | A1 * | 2/2018 | Middlebrook ........ G02F 1/2257 |
| 2018/0337743 | A1 | 11/2018 | Jou et al. |
| 2020/0386946 | A1 | 12/2020 | Barwicz |

OTHER PUBLICATIONS

Barwicz et al., "A compliant polymer interface with 1.4 dB loss between standard fibers and nanophotonic waveguides," Frontiers in Optics, Optical Society of America, 2016, 2 pages.
Barwicz et al., "Low-Cost Interfacing of Fibers to Nanophotonic Waveguides: Design for Fabrication and Assembly Tolerances," IEEE Photonics Journal 6.4, 2014, pp. 1-18.
Barwicz et al., "Optical Demonstration of a Compliant Polymer Interface between Standard Fibers and Nanophotonic Waveguides," Optical Fiber Communication Conference, Optical Society of America, 2015, 3 pages.
Chen et al., "Low-Loss and Broadband Cantilever Couplers Between Standard Cleaved Fibers and High-Index-Contrast Si 3 N 4 or Si Waveguides," IEEE Photonics Technology Letters 22.23 (2010): 1744-1746.
Khilo et al., "Efficient planar fiber-to-chip coupler based on two-stage adiabatic evolution," Optics Express 18.15 (2010): 15790-15806.
List of IBM Patents or Patent Applications Treated as Related; Date Filed: Date Jan. 11, 2021, 2 pages.
Shu et al., "Efficient coupler between chip-level and board-level optical waveguides," Optics Letters 36.18 (2011): 3614-3616.
Soganci et al., "Flip-chip optical couplers with scalable I/O count for silicon photonics," Optics Express 21.13 (2013): 16075-16085.

* cited by examiner

Known waveguide (WG) design approaches define the WG confinement parameters to achieve the best peak optical-loss performance - then compute the tolerance penalty Optical-loss curve 102A of the WG under design is symmetrical within the tolerance window 103A for a given set of WG confinement parameters

| | h1 | h2 | n1 | n2 | w3 | h3 | n3 | θ3 |
|---|---|---|---|---|---|---|---|---|
| Min_1 | 5 | 5 | 1.49 | n1 ±0.0006 | 4.0 | 2.4 | n1 × (1.007) | 30 |
| Max_1 | 5000 | 5000 | 1.54 | n1 ±0.0006 | 5.1 | 4.1 | n1 × (1.008) | 150 |
| Min_2 | 10 | 10 | 1.50 | n1 ±0.0006 | 4.2 | 1.4 | n1 × (1.010) | 45 |
| Max_2 | 200 | 200 | 1.52 | n1 ±0.0006 | 5.1 | 2.3 | n1 × (1.012) | 135 |
| Aligned with Fabrication Capabilities | 50 | 23 | 1.51 | 1.51 | 4.7 | 2.3 | n1 × (1.009) | 90 |

1000

All dimensions in microns, angle in degrees, refractive indices are dimensionless.

Parameters not changed from section A are underlined.

Parameters can be between *Min_1* and *Max_1* or *Min_2* and *Max_2*

*Tolerances of ± 0.25 um in width and ± 5% in height are assumed.*

FIG. 10

| | h1 | h2 | n1 | n2 | w3 | h3 | n3 | θ3 |
|---|---|---|---|---|---|---|---|---|
| Min_1 | 5 | 5 | 1.49 | n1-0.001 | 5.7 | 2.4 | n1 × (1.007) | 30 |
| Max_1 | 5000 | 5000 | 1.54 | n3 | 8.4 | 4.1 | n1 × (1.008) | 150 |
| Min_2 | 10 | 10 | 1.50 | n1-0.001 | 6.6 | 1.4 | n1 × (1.010) | 45 |
| Max_2 | 200 | 200 | 1.52 | n3 | 7.9 | 2.3 | n1 × (1.012) | 135 |
| Aligned with Fabrication Capabilities | 50 | 23 | 1.51 | 1.507 | 7.4 | 2.3 | n1 × (1.009) | 90 |

All dimensions in microns, angle in degrees, refractive indices are dimensionless.

Parameters not changed from section A are underlined.

Parameters can be between Min_1 and Max_1 or Min_2 and Max_2.

Tolerances of ± 0.25 um in width and ± 5% in height are assumed.

FIG. 11

FLEXIBLE WAVEGUIDE HAVING AN ASYMMETRIC OPTICAL-LOSS PERFORMANCE CURVE AND IMPROVED WORST-CASE OPTICAL-LOSS PERFORMANCE

DOMESTIC PRIORITY

This application is a divisional of U.S. patent application Ser. No. 16/433,005, filed Jun. 6, 2019, the disclosure of which is incorporated by reference herein in its entirety.

BACKGROUND

The present invention relates in general to data transmission systems. More specifically, the present invention relates to fabrication methods and resulting structures for a flexible waveguide having an asymmetric optical-loss performance curve and novel confinement parameters that are configured to improve the flexible waveguide's worst-case optical-loss performance within fabrication tolerances.

Integrated circuits (ICs) are typically formed from various circuit configurations of semiconductor-based devices formed on semiconductor wafers. Semiconductor-based devices are formed on semiconductor wafers by depositing many types of thin films of material over the semiconductor wafers, patterning the thin films of material, doping selective regions of the semiconductor wafers, etc. After completion of device level and interconnect level fabrication processes, the semiconductor devices on the wafer are separated and the final products is packaged.

The terms "interconnect bottleneck" describe limitations on the performance of data processing systems that result from interconnect limitations rather than IC performance. The electrons that transmit electronic data are sluggish and interact with one another and the IC copper wires through which they travel, thus limiting how much information electronic IC components can transmit. Interconnect bottlenecks are mitigated, and in many cases overcome, by replacing selected IO electronic data and metallic connections on ICs with photon-based optical data, waveguide transmission lines, and optical couplers. In contrast to the electrons that carry electronic data, the photons that carry optical data move at light speed with no interference, thus allowing many discrete pieces of information to be transmitted at once.

An IC having electro-optical components that can receive and process optical data is known generally as a photonic IC. Optical IO data received at a photonic IC are routed to target downstream optoelectronic components, as well as output optical fibers. Photonic ICs can be fabricated using processes similar to the previously described processes used to fabricate electronic ICs, which makes it possible to produce photonic ICs efficiently and at scale.

In general, an optical waveguide can be any structure that acts as a "light pipe" that confines and guides light. Optical waveguides can be implemented as dielectric structures that transmit various forms of radiation or electromagnetic waves in a direction along the waveguide's propagation axis. Optical waveguides are fundamental building blocks of many optical systems, including fiber-optic communications links; fiber lasers and amplifiers for high-power applications; and all-optical photonic ICs.

SUMMARY

Embodiments of the invention are directed an optical waveguide structure having waveguide dimensions that are within a range of fabrication tolerances. A non-limiting example of the optical waveguide structure includes a multi-segmented optical waveguide having a first waveguide segment that includes a set of first waveguide segment confinement parameters; a second waveguide segment communicatively coupled to the first waveguide segment and configured to route optical data through a routing path having bends, the second waveguide segment having a set of second waveguide segment confinement parameters; and a third waveguide segment communicatively coupled to the second waveguide segment and having a set of third waveguide segment confinement parameters. The multi-segmented optical waveguide is configured to confine and guide optical data according to an asymmetric optical-loss performance curve that is substantially asymmetrical with respect to a peak optical-loss performance level of the asymmetric optical-loss performance curve. The asymmetric optical-loss performance curve is a plot of the set of first waveguide segment confinement parameters, the set of second waveguide segment confinement parameters, and the set of third waveguide segment confinement parameters on a first axis; and a level of optical-loss performance that results from the set of first waveguide segment confinement parameters, the set of second waveguide segment confinement parameters, and the set of third waveguide segment confinement parameters on a second axis. The set of first waveguide segment confinement parameters, the set of second waveguide segment confinement parameters, and the set of third waveguide segment confinement parameters are configured to, collectively, maximize a predetermined worst-case optical-loss performance level of the asymmetric optical-loss performance curve within the range of fabrication tolerances.

Embodiments of the invention are directed an optical waveguide structure having waveguide dimensions that are within a range of fabrication tolerances. A non-limiting example of the optical waveguide structure includes a multi-segmented optical waveguide having a first waveguide segment that includes a set of first waveguide segment confinement parameters; a second waveguide segment communicatively coupled to the first waveguide segment and configured to route optical data through a routing path having bends, the second waveguide segment having a set of second waveguide segment confinement parameters; and a third waveguide segment communicatively coupled to the second waveguide segment and having a set of third waveguide segment confinement parameters. The multi-segmented optical waveguide is configured to confine and guide optical data according to an asymmetric optical-loss performance curve that is substantially asymmetrical with respect to a peak optical-loss performance level of the asymmetric optical-loss performance curve. The asymmetric optical-loss performance curve is a plot of the set of first waveguide segment confinement parameters, the set of second waveguide segment confinement parameters, and the set of third waveguide segment confinement parameters on a first axis; and a level of optical-loss performance that results from the set of first waveguide segment confinement parameters, the set of second waveguide segment confinement parameters, and the set of third waveguide segment confinement parameters on a second axis. The set of first waveguide segment confinement parameters, the set of second waveguide segment confinement parameters, and the set of third waveguide segment confinement parameters are each determined based at least in part on the range of fabrication tolerances. The set of first waveguide segment confinement parameters, the set of second waveguide segment confinement parameters, and the set of third waveguide segment confinement parameters are further configured to, collectively, provide the asymmetric optical-loss performance curve with a predetermined worst-case optical-loss performance level within the range of fabrication tolerances.

Embodiments of the invention are directed to an optical coupling system. A non-limiting example of the optical coupling system includes an optical fiber communicatively coupled to a flexible waveguide structure and a photonic integrated circuit communicatively coupled to the flexible waveguide structure that includes a multi-segmented optical waveguide that includes a first waveguide segment having a set of first waveguide segment confinement parameters; a second waveguide segment communicatively coupled to the first waveguide segment and configured to route optical data through a routing path having bends, the second waveguide segment having a set of second waveguide segment confinement parameters; and a third waveguide segment communicatively coupled to the second waveguide segment and having a set of third waveguide segment confinement parameters. The multi-segmented optical waveguide is configured to guide optical data according to an asymmetric optical-loss performance curve that is substantially asymmetrical with respect to a peak optical-loss performance level of the asymmetric optical-loss performance curve. The asymmetric optical-loss performance curve is a plot of the set of first waveguide segment confinement parameters, the set of second waveguide segment confinement parameters, and the set of third waveguide segment confinement parameters on a first axis; and a level of optical-loss performance that results from the set of first waveguide segment confinement parameters, the set of second waveguide segment confinement parameters, and the set of third waveguide segment confinement parameters on a second axis. The set of first waveguide segment confinement parameters, the set of second waveguide segment confinement parameters, and the set of third waveguide segment confinement parameters are configured to, collectively, maximize a worst-case optical-loss performance of the asymmetric optical-loss performance curve within the range of fabrication tolerances.

Embodiments of the invention are directed to a method of using a flexible waveguide having waveguide dimensions that are within a range of fabrication tolerances. A non-limiting example of the method includes using the flexible waveguide to couple optical signals in a first direction from an optical fiber to a photonic integrated circuit; and using the flexible waveguide to couple optical signals in a second direction from the photonic integrated circuit to the optical fiber. The flexible waveguide includes a multi-segmented optical waveguide that includes a first waveguide segment having a set of first waveguide segment confinement parameters; a second waveguide segment communicatively coupled to the first waveguide segment and configured to route optical data through a routing path having bends, the second waveguide segment having a set of second waveguide segment confinement parameters; and a third waveguide segment communicatively coupled to the second waveguide segment and having a set of third waveguide segment confinement parameters. The multi-segmented optical waveguide is configured to guide optical data according to an asymmetric optical-loss performance curve that is substantially asymmetrical with respect to a peak optical-loss performance level of the asymmetric optical-loss performance curve. The asymmetric optical-loss performance curve is a plot of the set of first waveguide segment confinement parameters, the set of second waveguide segment confinement parameters, and the set of third waveguide segment confinement parameters on a first axis; and a level of optical-loss performance that results from the set of first waveguide segment confinement parameters, the set of second waveguide segment confinement parameters, and the set of third waveguide segment confinement parameters on a second axis. The set of first waveguide segment confinement parameters, the set of second waveguide segment confinement parameters, and the set of third waveguide segment confinement parameters are configured to, collectively, maximize a predetermined worst-case optical-loss performance level of the asymmetric optical-loss performance curve within the range of fabrication tolerances.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 10 depicts a table showing confinement parameters and ranges of confinement parameters of the cross-sectional view of the FP-WG shown in FIG. 8, taken along line B-B of the FP-WG shown in FIG. 4A, wherein the confinement parameters and ranges of confinement parameters are determined in accordance with the method shown in FIG. 6; and FIG. 11 depicts a table showing confinement parameters and ranges of confinement parameters of the cross-sectional view of the FP-WG shown in FIG. 8, taken along line C-C of the FP-WG shown in FIG. 4A, wherein the confinement parameters and ranges of confinement parameters are determined in accordance with the method shown in FIG. 6.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

It is understood in advance that, although this description includes a detailed description of a particular flexible waveguide architecture, implementation of the teachings recited herein are not necessarily limited to a particular flexible waveguide architecture. Rather embodiments of the present invention are capable of being implemented in conjunction with any other type of flexible waveguide architecture, now known or later developed, as long as the flexible waveguide architecture can incorporate the novel waveguide fabrication operations, resulting waveguide structures, and methods of use described herein.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are relevant to aspects of the invention, as previously described herein, interconnect bottlenecks are mitigated, and in many cases overcome, by replacing selected electrical data transmission and metallic connections with optical data transmission and optics-based structures for carrying the optical data to target downstream photonic and optoelectronic components. Optical loss, which can be measured in decibels (dB), is a limiting factor in the effective and efficient implementation of optical data transmission systems and downstream optical routing systems.

Figure 1A:
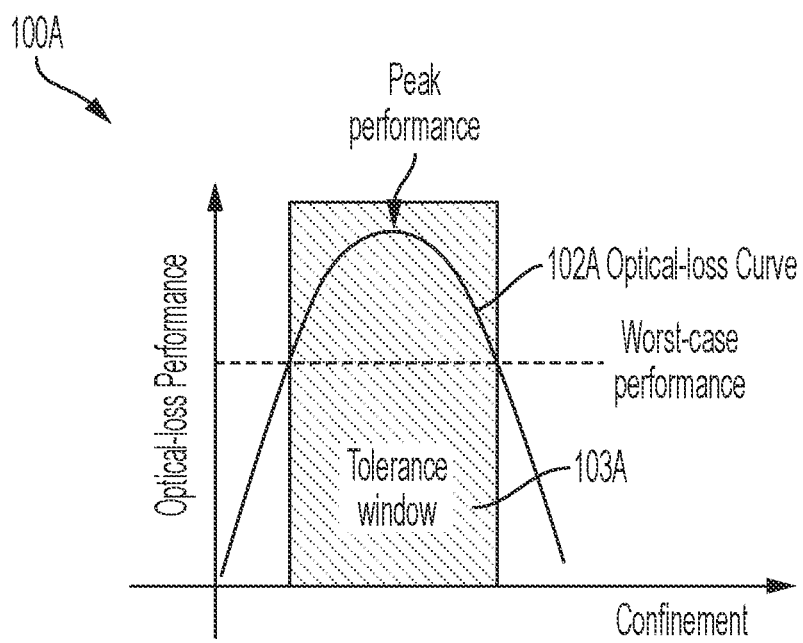
FIG. 1A depicts a plot illustrating a known waveguide design approach.

FIG. 1A depicts an optical-loss plot 100A that results from a known waveguide design approach that selects and defines the waveguide confinement parameters in a manner that maximizes the peak optical-loss performance of the waveguide-under-design within the waveguide's fabrication tolerance window 103A. For ease of reference, this general type of waveguide design approach will be referred to herein as a "maximize peak optical-loss performance" (MPOLP) waveguide design approach. The optical-loss plot 100A plots on the y-axis the optical-loss performance of the waveguide-under-design, and plots on the x-axis the level of optical confinement within the waveguide-under-design based on various waveguide confinement parameters. In general, a smaller optical-loss performance value represents a relatively larger optical loss, and a larger optical-loss performance value represents a relatively smaller optical loss. An optical waveguide's ability to guide and confine optical signals can be classified according to a variety of so-called "confinement parameters," which can include any waveguide feature/parameter that impacts the waveguide's ability to guide and confine optical signals, including for example, the waveguide's geometry (e.g., planar, slab/strip, fiber waveguides, etc.), refractive index, refractive index distribution (e.g., step, gradient, etc.), guiding mechanism (e.g., total internal reflection, anti-guiding, photonic bandgap, etc.), material (e.g., glass, polymer, semiconductor, etc.), and the like. Electromagnetic field distributions that are invariant with propagation, when time averaged, are known as modes. Modes can have an associated polarization of light, which is, in general, a dominant orientation of the electric field of light. For high-speed data transmission, it may or may not be preferred to use so-called single-mode waveguides, which are waveguides that can only propagate one mode of each polarization. Waveguides that can sustain additional modes are called multimode waveguides.

In the MPOLP waveguide design approach depicted in FIG. 1A, once the confinement parameters have been defined for maximum peak optical-loss performance, the tolerance penalty of the defined confinement parameters is calculated. Accordingly, while MPOLP waveguide design approaches can maximize peak optical-loss performance, the resulting waveguide design is susceptible to significant fabrication tolerance penalties (worst-case optical-loss performance level shown in FIG. 1A) within the fabrication tolerance window 103A.

The shape of the optical-loss curve 102A is generally expected to be symmetrical around the peak optical-loss performance of the optical-loss curve 102A. This is not only generally true with respect to the function of confinement but also with respect to the function of other parameters such as alignment of components or resonant frequencies of resonators. Although the symmetrical shape of the optical-loss curve 102A is accurate for many structures, aspects of the invention (described in greater detail subsequently herein) rest on and leverage a non-obvious discovery that the symmetrical shape of the optical-loss curve 102A is not accurate when the waveguide-under-design is a low-confinement waveguide in which at least some of the low-confinement waveguide's confinement parameters have a strongly non-linear relationship with the waveguide's level of confinement. An example of such a low-confinement waveguide is a flexible polymer waveguide (FP-WG) 120 shown in cross-section in FIG. 1B.

Figure 1B:
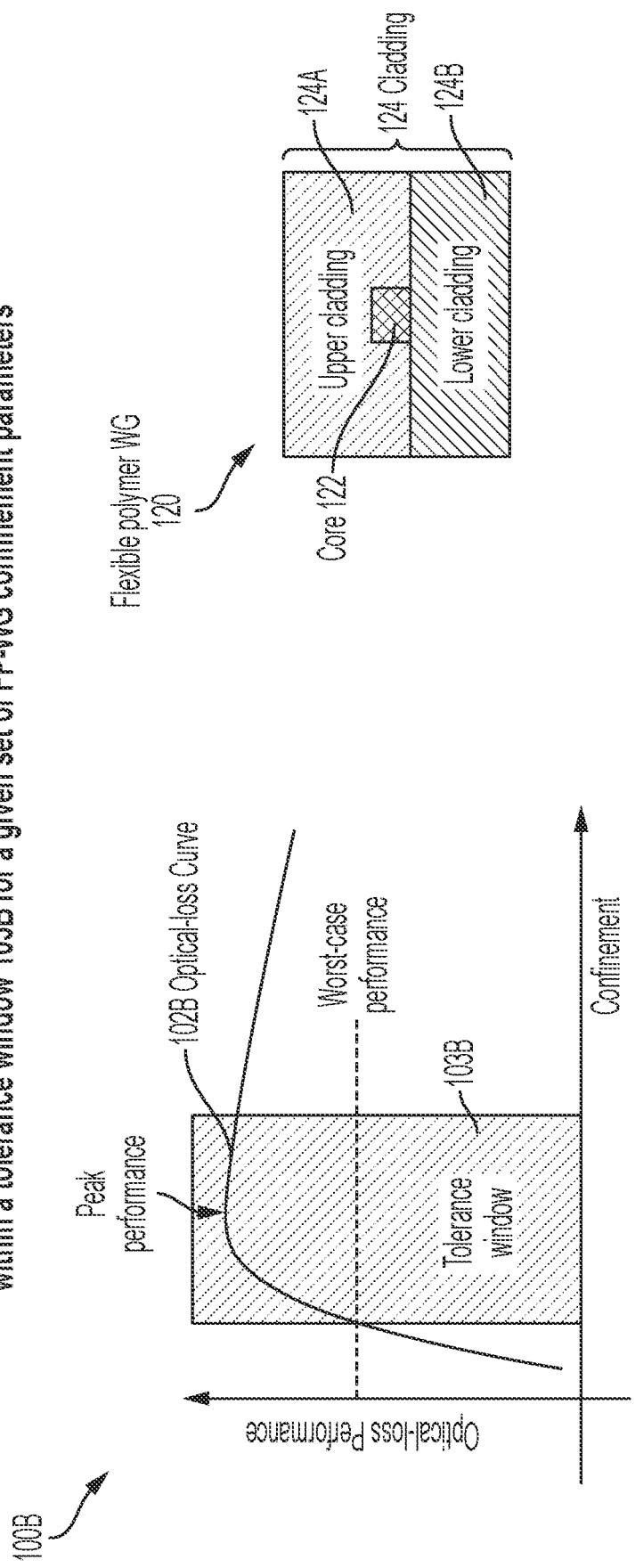
FIG. 1B depicts a plot and a diagram illustrating a discovery in accordance with aspects of the invention.

FIG. 1B depicts an optical-loss plot 100B and the cross-sectional view of the FP-WG 120. The optical-loss plot 102B illustrates the above-described discovery in accordance with aspects of the invention that the optical-loss curve 102B and its associated worst-case optical-loss performance are asymmetrical within the fabrication tolerance window 103B of the FP-WG 120. As shown in FIG. 1B, the FP-WG 120 includes a core 122 and a cladding 124 having a lower cladding region 124A and an upper cladding region 124B. Examples of FP-WG design parameters that affect waveguide confinement in a non-liner way include the height and width of the waveguide core 122, the index contrast between the core 122 and the cladding 124, and the index contrast between the lower cladding 124A and the upper cladding 124B. More specifically, higher width/height/index-contrast values in the FP-WG 120 provide higher confinement, while asymmetry between the refractive index of the lower cladding region 124A and the refractive index of the upper cladding region 124B reduces confinement.

Similar to the symmetrical optical-loss curve 102A shown in FIG. 1A, the MPOLP waveguide design approach was used to define the confinement parameters of the waveguide associated with the asymmetrical optical-loss curve 102B shown in FIG. 1B. When the MPOLP design approach is used in an optical structure with notably asymmetric optical loss performance as a function of the structure's design parameters, the resulting FP-WG design is susceptible to relatively large tolerance penalties (worst-case optical-loss performance level shown in FIG. 1B) within the expected window of fabrication tolerances 103B.

Figure 2:
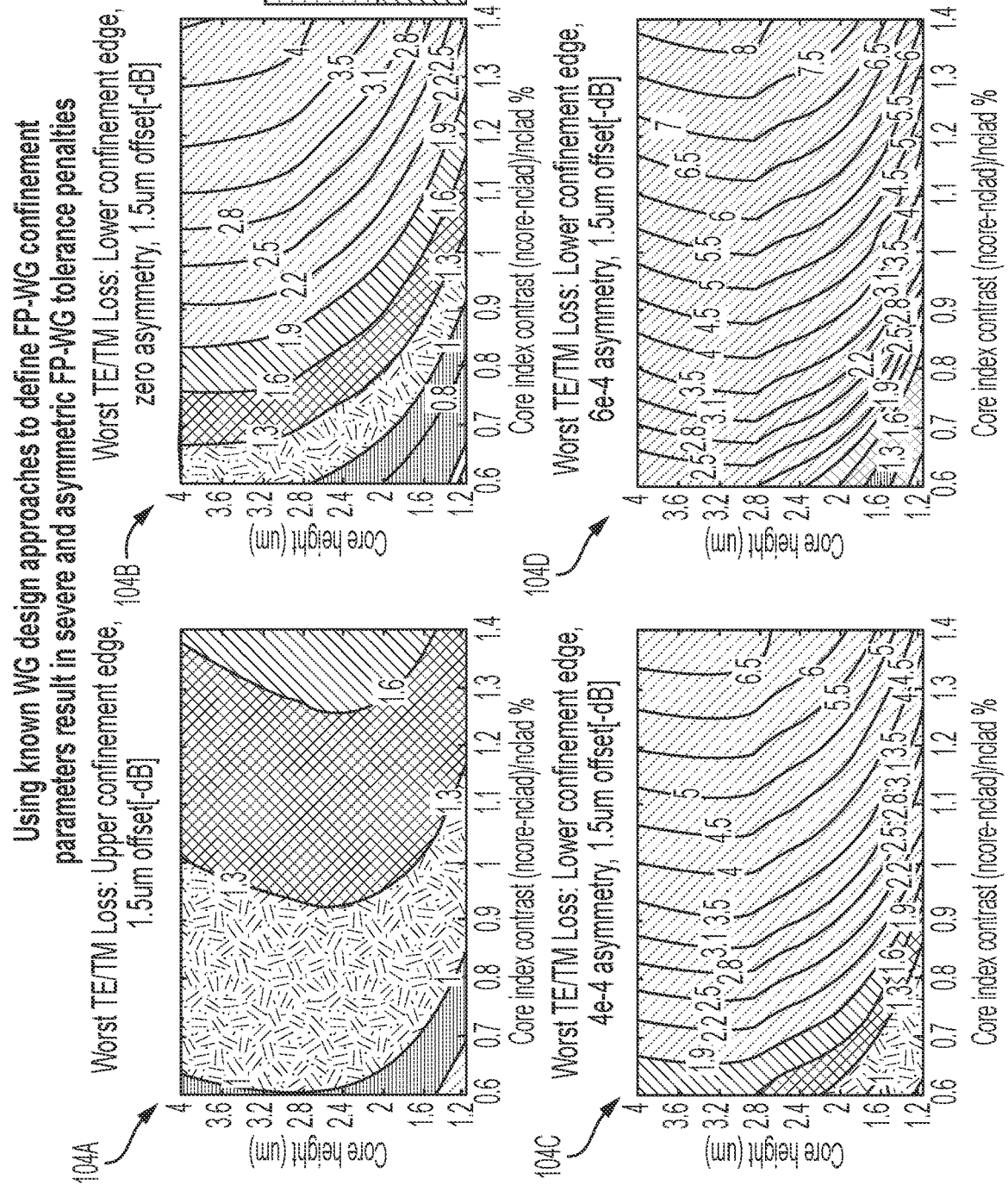
FIG. 2 depicts optical-loss maps and a diagram further illustrating a discovery in accordance with aspects of the invention.

FIG. 2 depicts optimization maps 104A-104D and a cross-sectional view of the FP-WG 120, all of which illustrate that the fabrication tolerance penalty that results from applying the MPOLP design approach to the low-confinement FP-WG 120 is severe. In general, the points on the optical-loss curve 102B can be taken from the optimization maps 104A-104D. More specifically, the MPOLP design approach was applied to find the core width that maximizes the transmission between an optical fiber and an FP-WG (e.g., the FP-WG 120). This was done for a set of core height and index contrasts. Each point on maps 104A-104D shows the optical loss at such transition when various fabrication tolerances are applied. This is for the full set of core height, index contrast, and MPOLP obtained width. The maps 104A-140D can be created using known optical simulation software (e.g., optical simulator 514 shown in FIG. 5A) controlled by known mathematical control software (e.g., mathematical computing and control module 512 shown in FIG. 5A) to plot the expected optical-loss performance against a selected criterion for different values of a particular confinement parameter at different locations in the fabrication tolerance window 103B (shown in FIG. 1B). For the example depicted in FIG. 2, the criterion is maximizing peak optical-loss performance, and the confinement parameter is the index contrast of the core 122 of the FP-WG 120. Thus, each map 104A-104D depicts the impact of different index contrast values of the core 122 on peak optical-loss performance. A point on the right side of the optical-loss curve 102B would be taken from the map 104A, and points on the left side of the optical-loss curve 102B would be taken from the maps 104B-104D. Thus, the maps 104A-104D show examples of worst-case optical-loss in optical fiber to FP-WG 120 coupling when the low-confinement FP-WG 120 is designed to maximize the peak optical-loss performance of the optical-loss performance curve 102B.

Turning now to an overview of aspects of the invention, embodiments of the invention address the above-described shortcomings of the prior art by providing a low-confinement flexible waveguide with confinement parameters that have been configured and arrange to maximize a worst-case optical-loss performance of the low-confinement flexible waveguide within the waveguide's fabrication tolerance window. In accordance with aspects of the invention, the low-confinement flexible waveguide confinement parameters appreciate and take into account the asymmetric impact that the low-confinement waveguide confinement parameters have on optical-loss performance and worst-case optical-loss performance in that the low-confinement flexible waveguide confinement parameters do not attempt to maximize, and do not consider, the impact that the selected and defined confinement parameters have on peak optical-loss performance of the low-confinement flexible waveguide. In some aspects of the invention, the low-confinement flexible waveguide confinement parameters are defined based at least in part on fabrication tolerances of the flexible waveguide, and based at least in part on minimizing the impact that the fabrication tolerances have on the worst-case optical-loss performance of the flexible waveguide. Hence, flexible waveguides having confinement parameters in accordance with aspects of the invention are robust to variations in fabrication tolerances in that the novel confinement parameters make the flexible waveguide less susceptible to variations in the worst-case optical-loss performance of the flexible waveguide over a range of fabrication tolerances.

In some aspects of the invention, the novel flexible waveguide confinement parameters are further configured to enable the low-confinement flexible waveguide to be fabricated using known layer-by-layer planar fabrication techniques. More specifically, aspects of the invention place fabrication constraints on selected ones of the flexible waveguide confinement parameters to enable the flexible waveguide to be fabricated using know layer-by-layer planar fabrication techniques. For example, in some aspects of the invention, known layer-by-layer planar fabrication operations are used to fabricate the flexible waveguide, and these layer-by-layer planar fabrication operations dictate that the flexible waveguide has a substantially uniform height, cladding refractive index, and core refractive index throughout the length of the flexible waveguide. Hence, in some aspects of the invention, the height, cladding refractive index, and core refractive index of the flexible waveguide are defined to maximize the worst-case optical-loss performance of the flexible waveguide while also remaining substantially uniform throughout the length of the flexible waveguide to enable the layer-by-layer planar fabrication of the flexible waveguide. Additionally, in accordance with aspects of the invention, the fabrication constraints placed on the flexible waveguide confinement parameters can include fabrication capabilities that limit the flexible waveguide confinement parameters to a predetermined minimum feature size, which can, for example, set the minimum width of the flexible waveguide. Hence, in some aspects of the invention, the width of the flexible waveguide is defined to maximize the worst-case optical-loss performance of the flexible waveguide while also maintaining a minimum width dictated by the minimum feature size constraints of the relevant layer-by-layer planar fabrication processes used to form the flexible waveguide.

In some aspects of the invention, a low-confinement flexible waveguide having novel flexible waveguide confinement parameters in accordance with embodiments of the invention is a multi-segmented flexible waveguide, wherein each waveguide segment has novel segment confinement parameters that "globally" maximize a worst-case optical-loss performance of all the segments of the flexible waveguide within the waveguide's fabrication tolerance window while also taking into account optical-loss characteristics that are unique to the particular waveguide segment. For example, in some embodiments of the invention, the multi-segmented waveguide includes a first waveguide segment configured to communicatively couple to an optical fiber; a second waveguide segment communicatively coupled to the first waveguide segment and configured to include bends for routing the second waveguide segment through a predetermined path; and a third waveguide segment communicatively coupled to the second waveguide segment and configured to communicatively couple to a photonic IC. In the first waveguide segment, the optical-loss characteristics that are unique to the first waveguide segment include optical-loss characteristics associated with coupling a relatively large optical fiber mode (e.g., about 10 microns wide) to the first waveguide segment. In the second waveguide segment, the optical-loss characteristics that are unique to the second waveguide segment include optical-loss characteristics associated with bends in the second waveguide segment that result from routing the second waveguide segment through a predetermined path. In the third waveguide segment, the optical-loss characteristics that are unique to the third waveguide segment include optical-loss characteristics associated with coupling the third waveguide segment to the photonic IC.

In accordance with aspects of the invention, each set of novel waveguide segment confinement parameters does not attempt to maximize, and does not consider, the impact that the set of novel waveguide segment confinement parameters has on peak optical-loss performance of the multi-segmented flexible waveguide. In some aspects of the invention, each set of novel waveguide segment confinement parameters is defined based at least in part on fabrication tolerances of the multi-segmented flexible waveguide, and based at least in part on minimizing the impact that the fabrication tolerances have on the worst-case optical-loss performance of the multi-segmented flexible waveguide. Hence, multi-segmented flexible waveguides having the novel waveguide segment confinement parameters in accordance with aspects of the invention are robust to variations in fabrication tolerances in that the sets of waveguide confinement parameters make the multi-segmented flexible waveguide less susceptible to variations in the worst-case optical-loss performance of the multi-segmented flexible waveguide over a range of the waveguide's fabrication tolerances.

In some aspects of the invention, the sets of novel waveguide segment confinement parameters are further configured to enable the multi-segmented flexible waveguide to be fabricated using known layer-by-layer planar fabrication techniques. More specifically, aspects of the invention place fabrication constraints on selected ones of the sets of waveguide segment confinement parameters to enable the multi-segmented flexible waveguide to be fabricated using know layer-by-layer planar fabrication techniques. For example, in some aspects of the invention, the layer-by-layer planar fabrication operations dictate that the multi-segmented flexible waveguide has a substantially uniform height, cladding refractive index, and core refractive index throughout the length of the multi-segmented flexible waveguide. Hence, in some aspects of the invention, the height, cladding refractive index, and core refractive index of the multi-segmented flexible waveguide are defined to maximize the worst-case optical-loss performance of each segment of the multi-segmented flexible waveguide while remaining substantially uniform throughout the length of the multi-segmented flexible waveguide to improve the ability to use layer-by-layer planar fabrication techniques to form the multi-segmented flexible waveguide. Additionally, in accordance with aspects of the invention, the fabrication constraints placed on the sets of waveguide segment confinement parameters can include fabrication capabilities that limit the sets of waveguide segment confinement parameters to predetermined minimum feature sizes, which can set, for example, the minimum width of the multi-segmented flexible waveguide. Hence, in some aspects of the invention, the width of each segment of the multi-segmented flexible waveguide is defined to maximize the worst-case optical-loss performance of the waveguide segment while also maintaining a minimum width dictated by the minimum feature size constraints of the relevant layer-by-layer planar fabrication processes used to form the multi-segmented flexible waveguide.

Figure 3A:
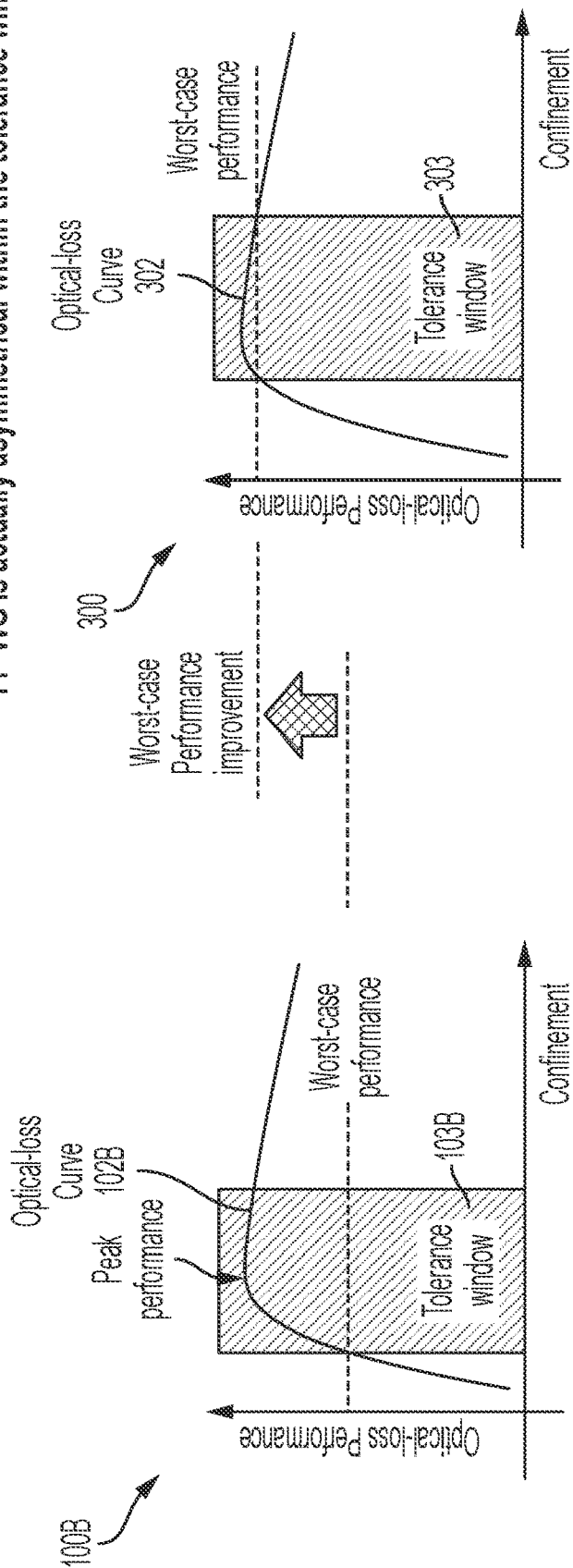
FIG. 3A depicts optical-loss plots that compare results of the known waveguide design approach shown in FIG. 1B with results of a novel waveguide design approach in accordance with aspects of the invention.

Turning now to a more detailed description of aspects of the invention, FIG. 3A depicts the optical-loss performance plot 100B (also shown in FIG. 1B) alongside an optical-loss performance plot 300 to compare results of the MPOLP waveguide design approach (represented by the optical-loss plot 100B) with results of a novel waveguide design approach in accordance with aspects of the invention (represented by the optical-loss plot 300). The structure-under-design associated with the optical-loss plot 300 is a FP-WG 420 (shown in FIGS. 4A and 4B). The novel waveguide design approach associated with the optical-loss plot 300 rests on and leverages a discovery in accordance with aspects of the invention that the optical-loss performance curve 302 of the FP-WG 420 is asymmetric within the fabrication tolerance window 303, and more specifically is asymmetric with respect to a peak optical-loss performance level of the optical-loss performance curve 302. In aspects of the invention, the novel waveguide design approach defines the confinement parameters of the FP-WG 420 (tables 900, 1000, 1100 shown in FIGS. 9, 10, and 11) based at least in part on fabrication tolerances of the FP-WG 420. In aspects of the invention, the novel waveguide design approach further defines the confinement parameters of the FP-WG 420 to provide a maximized worst-case optical-loss performance (or a "best" worst-case optical-loss level) of the FP-WG 420 within the fabrication tolerance window 303. As a result, the worst-case optical-loss performance for the optical-loss curve 302 is a substantial improvement over the worst-case optical-loss performance for the optical-loss curve 102B. For ease of reference, the novel waveguide design approach in accordance with aspects of the invention is referred to herein as a "maximize worst-case optical-loss performance" (MWC-OLP) waveguide design approach. For ease of reference, the novel waveguide confinement parameters that result from the MWC-OLP design approach in accordance with aspects of the invention is referred to herein as MWC-OLP waveguide confinement parameters.

Figure 3B:
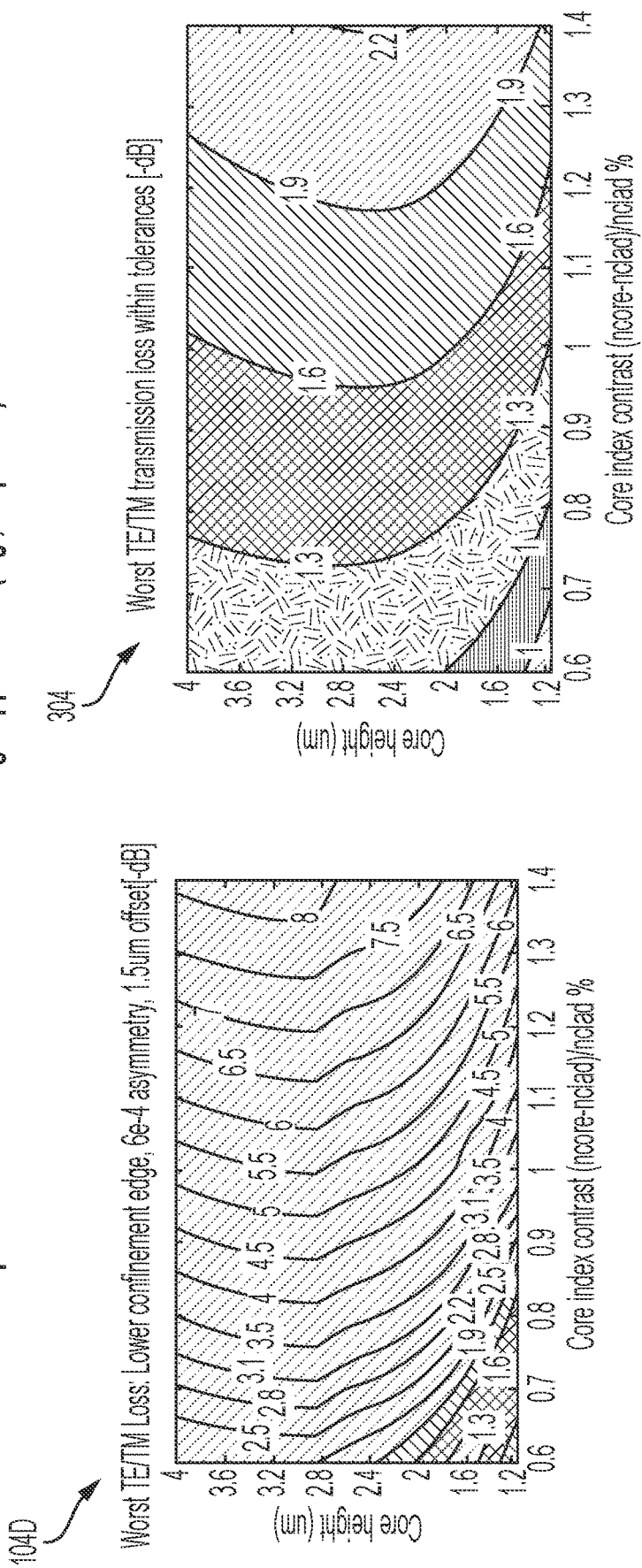
FIG. 3B depicts optical-loss maps that further compare results of the known waveguide design approach shown in FIG. 1B with results of the novel waveguide design approach in accordance with aspects of the invention.

FIG. 3B depicts optimization plots 104D, 304 that compare results of the known MPOLP waveguide design approach shown in FIGS. 1B and 3A with results of the novel MWC-OLP waveguide design approach in accordance with aspects of the invention, wherein the structure-under-design is the FP-WG 420 with performance shown for section 412 (shown in FIGS. 4A and 4B), wherein the novel MWC-OLP waveguide design approach defines the MWC-OLP confinement parameters of the FP-WG 420 based at least in part on fabrication tolerances of the FP-WG 420, and wherein the novel MWC-OLP waveguide design approach further defines the MWC-OLP confinement parameters to, collectively, provide a maximized worst-case optical-loss performance level (or a "best" worst-case optical-loss level) of the optical-loss curve 302 (shown in FIG. 3A) within the fabrication tolerance window 303 of the FP-WG 420. For the optimization plot 104D, the optical-loss is about 5 dB (a generally poor optical-loss) for a core index contrast of about 1% and a core height of about 2.5 microns. For the optimization plot 304, the optical-loss is about 1.6 dB (a generally superior optical-loss performance) for a core index contrast of about 1% and a core height of about 2.5 microns.

Figure 4A:
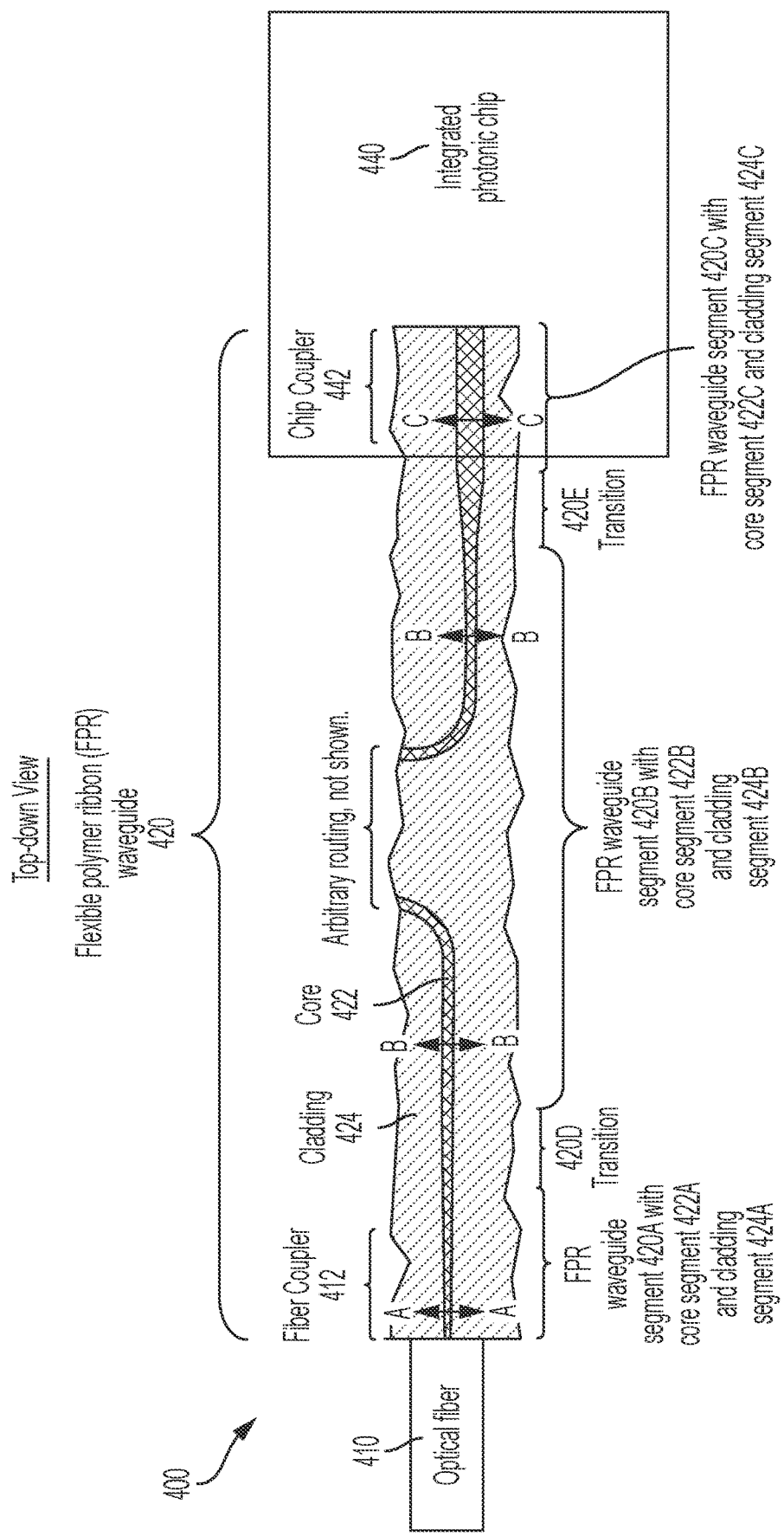
FIG. 4A depicts a top-down view of an optical coupling system according to embodiments of the invention.
Figure 4B:
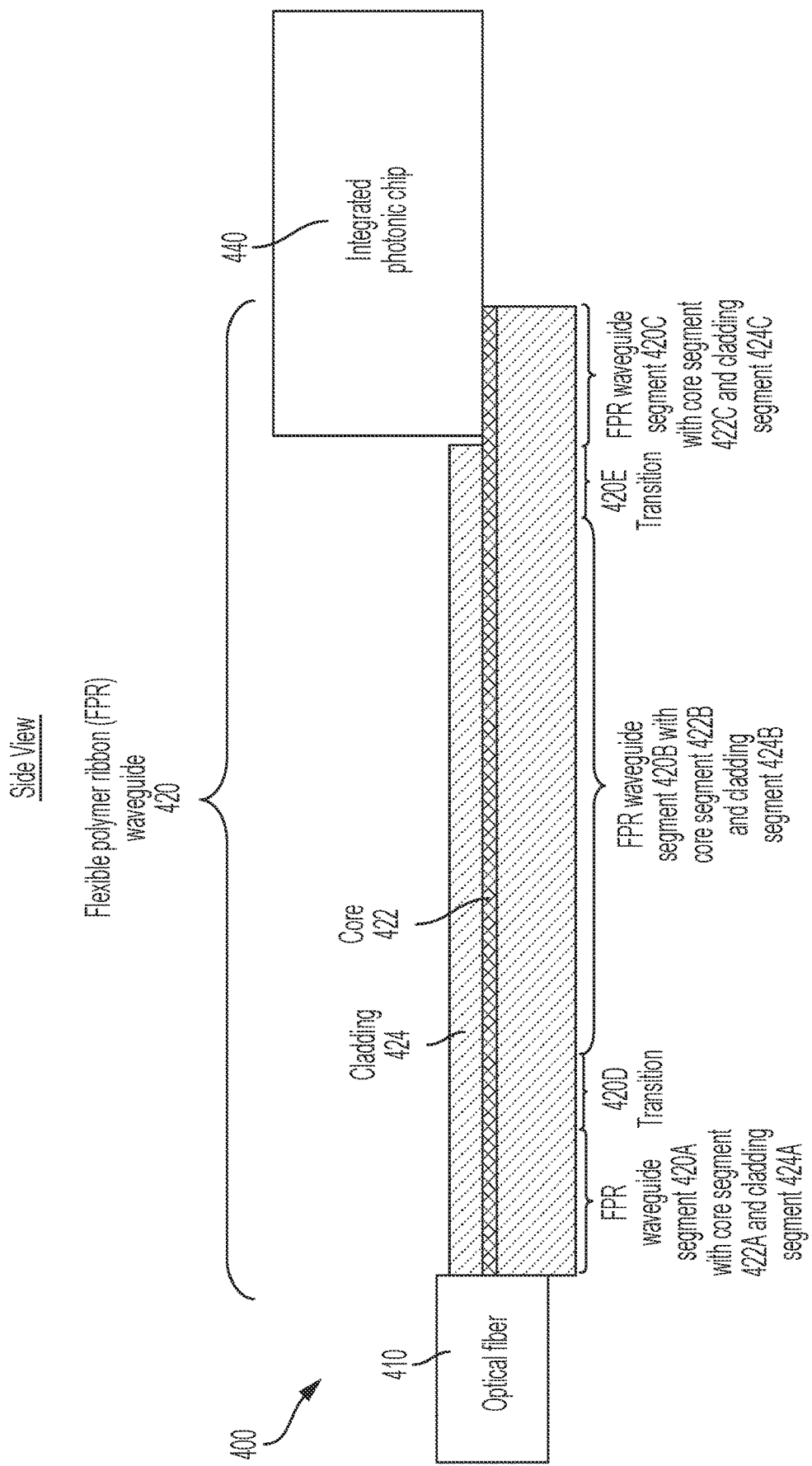
FIG. 4B depicts a side-view of the optical coupling system shown in FIG. 4A.

Examples of how the MWC-OLP waveguide design approach is used to form the FP-WG 420 having MWC-OLP confinement parameters will now be described with reference to FIGS. 4A-11. FIG. 4A depicts a top-down view of an optical coupling system 400 according to embodiments of the invention, and FIG. 4B depicts a side-view of the optical coupling system 400 shown in FIG. 4A. Referring more specifically to the top-down view shown in FIG. 4A, the optical coupling system 400 includes an optical fiber 410, a fiber coupler 412, the FP-WG 420, a chip coupler 442, and an integrated photonic chip 440, configured and arranged as shown. The FP-WG 420 includes a fiber coupler region 412 at one end of the FP-WG 420 and a chip coupler region 442 at an opposite end of the FP-WG 420. The optical fiber 410 is communicatively coupled to the FP-WG 420 through the fiber coupler 412 region 412, and the FP-WG 420 is communicatively coupled to the integrated photonic chip 440 through the chip coupler region 442. The FP-WG 420 includes a core 422 and a cladding 424. In accordance with aspects of the invention, the FP-WG 420, the core 422 and the cladding 424 are each multi-segmented. The multi-segmented FP-WG 420 includes a FP-WG segment 420A (which includes the fiber coupler region 412), a transition segment 420D, a FP-WG segment 420B, a transition segment 420E, and a FP-WG segment 420C (which includes the chip coupler region 442). The transition segment 420D transitions the multi-segmented FP-WG 420 from the FP-WG segment 420A to the FP-WG segment 420B. Any suitable known technique can be used to form the transition segment 420D. Similarly, the transition segment 420E transitions the multi-segmented FP-WG 420 from the FP-WG segment 420B to the FP-WG segment 420C. Any suitable known technique can be used to form the transition segment 420E. The FP-WG segment 420A includes a core segment 422A and a cladding segment 424A. The FP-WG segment 420B includes a core segment 422B and a cladding segment 424B. The FP-WG segment 420C includes a core segment 422C and a cladding segment 424C. The line A-A through the FP-WG segment 420A represents a cross-sectional view of the FP-WG segment 420A. The line B-B through the FP-WG segment 420B represents a cross-sectional view of the FP-WG segment 420B. The line C-C through the FP-WG segment 420C represents a cross-sectional view of the FP-WG segment 420C. The line A-A, line B-B, and line C-C cross-sectional views are shown collectively by the generic cross-sectional view of the FP-WG 420 shown in FIG. 8 (described subsequently herein).

The optical fiber(s) 410 of the illustrated embodiments of the invention can be formed from, for example, doped silica glass and/or polymer material. The optical fiber 410 can be cylindrical in shape and is designed to guide single-mode optical signals. In the illustrated embodiments of the invention, the cladding (not shown) of the optical fiber 410 has a diameter that is between approximately 40 to 130 microns (μm), or 80, 90, or 125 μm. The core (not shown) of the optical fiber 410 has a diameter between 2 and 15 μm, or between 8 and 11 The optical fiber 410 is held in proximity to the optical fiber coupler region 412 using any of multiple known structures configured and arranged to secure the optical fiber 410 and through the fiber coupler region 412 to the FP-WG 420 (specifically, the FP-WG segment 422A) in an optically aligned mating arrangement. The fiber coupler region 412 is configured in accordance with aspects of the invention to includes a mode that is similar to the mode of the optical fiber 410 to provide low-loss transitions from the optical fiber 410 to the optical fiber coupler 412 of the FP-WG 420 (specifically, the FP-WG segment 422A).

The FP-WG 420 is shown in simplified form for ease of illustration and explanation. The FP-WG 420 can include a flexible substrate portion (not shown). The flexible substrate portion can include, for example, a polyimide, polysilane, polynorbornene, polyethylene, epoxy, acrylic resin, or a fluorinated derivative of a resin material. The flexible substrate portion can be substantially transparent for wavelengths between approximately 350 and 400 nm. The flexible substrate portion can be approximately 15 to 1000 μm thick, 0.1-50 mm wide, and 0.1 to 500 mm long. The flexible substrate portion can also define the cladding 424 of the FP-WG 420.

The core 422 of the FP-WG 420 can be formed using spin-on deposition and photolithographic methods. The core 422 is substantially transparent to the optical signals, can be formed from a polymer material, and is surrounded by the cladding portion(s) 424, described in greater detail below. The cladding portion 424 is substantially transparent to the optical signals. The wavelength range of the optical signals transmitted through the optical coupling system 400 can be, for example, between 950 and 1650 nanometers (nm), or for a 100 or 65 nm wide wavelength spectrum located between 950 and 1650 nanometers (nm). The FP-WG 420 is a single-mode waveguide, and the core 422 is formed from a substantially transparent material such as, for example, a polymer material having a propagation loss that is less than 10 dB/cm, or less than approximately 2 dB/cm for the wavelength range of the optical signals (350-2500 nm, or 800-1650 nm, or 1280-1600 nm, or for a 60 nm wide wavelength spectrum, located between 950 and 1650 nanometers (nm)).

In the illustrated embodiments of the invention, the fiber coupler region 412 of the FP-WG segment 420A functions as an efficient coupler to optical fibers, segment 420D as a first optical mode converter portion, FP-WG segment 420B functions as a routing portion, segment 420E as a second optical mode converter portion, and the FP-WG segment 420C functions as an adiabatic coupler to the integrated photonic chip 440. In the illustrated embodiments of the invention, the FP-WG segment 422A is arranged to provide adequate mode matching for butt-coupling to the optical fiber 410 while the FP-WG segment 422C is arranged to provide adiabatic coupling to the integrated photonic chip 440.

Figure 5A:
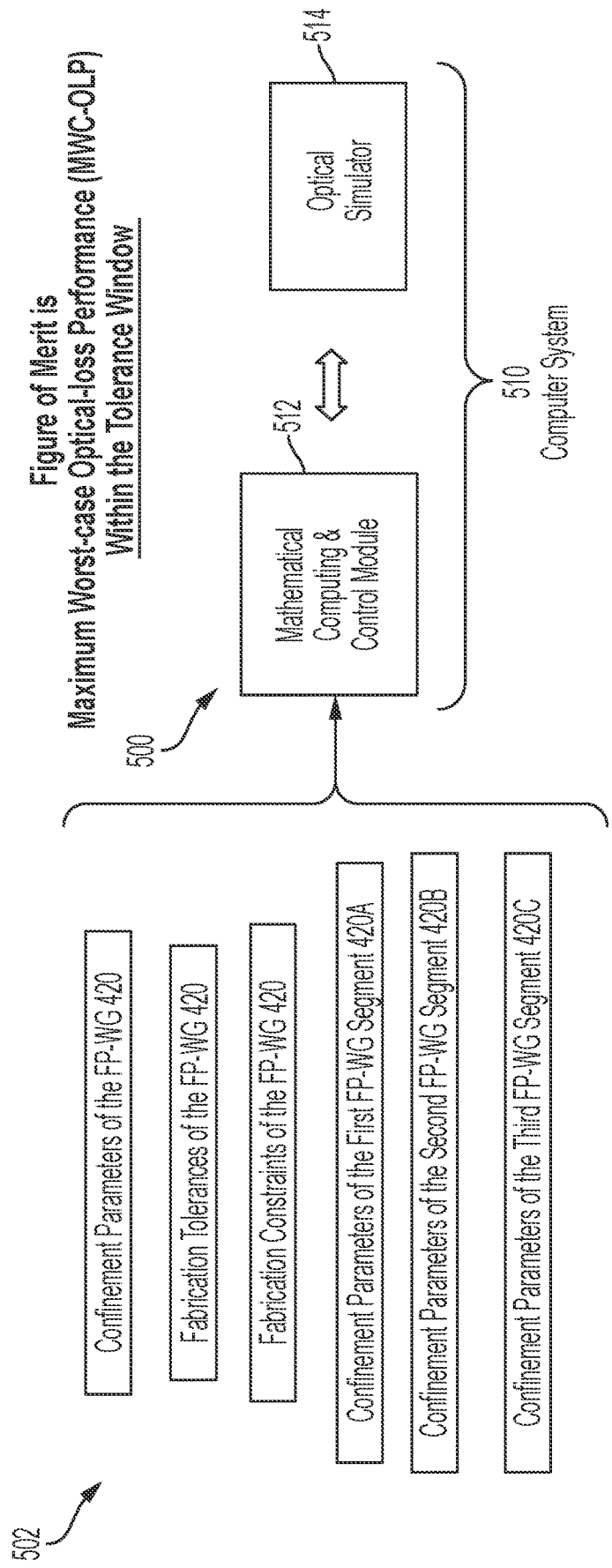
FIG. 5A depicts a computer-based optical simulation and design (OSD) system configured to implement aspects of the invention.

FIG. 5A depicts a computer-based optical simulation and design (OSD) system configured to a implement a MWC-OLP waveguide design approach in accordance with aspects of the invention. The OSD system 500 includes a mathematical computing & control (MCC) module (or algorithm) 512 communicatively coupled to an optical simulator 514. The optical simulator 514 can be implemented as a known commercially available algorithm running on the computer system 510. The optical simulator 514 is configured to simulate the expected optical performance of a waveguide based on the waveguide's design parameters. The MCC module 512 can be implemented as a commercially available algorithm running on the computer system 510. An example of a suitable known softare program for implementing the MCC module 512 is a software program known commercially as MATLAB® and available from MathWorks® or fimmPROP® by Photon Design®. The MCC module 512 can be used to control the simulator 514 to run multiple simulations to develop the various optimzation maps 104A, 104B, 104C, 104D, 304 (shown in FIGS. 2 and 3B) and the combined-loss optimization map 700 (shown in FIG. 7) that are used to optimize the worst-case optical-loss performance based on a combination of parameters/constraints/tolerances 502. The optimization routines used in the MCC module 512 are blind to the problem that is being solved, and can be programmed using routine skill in the relevant arts to define what is known as an "objective function," an "error function," or a "figure-of-merit," which is just the characteristic that optimization algorithms of the MCC module 512 optimizes. In accordance with aspects of the invention, the figure-of-merit is the worst-case optical-loss performance within the waveguide's fabrication tolerance window.

Figure 5B:
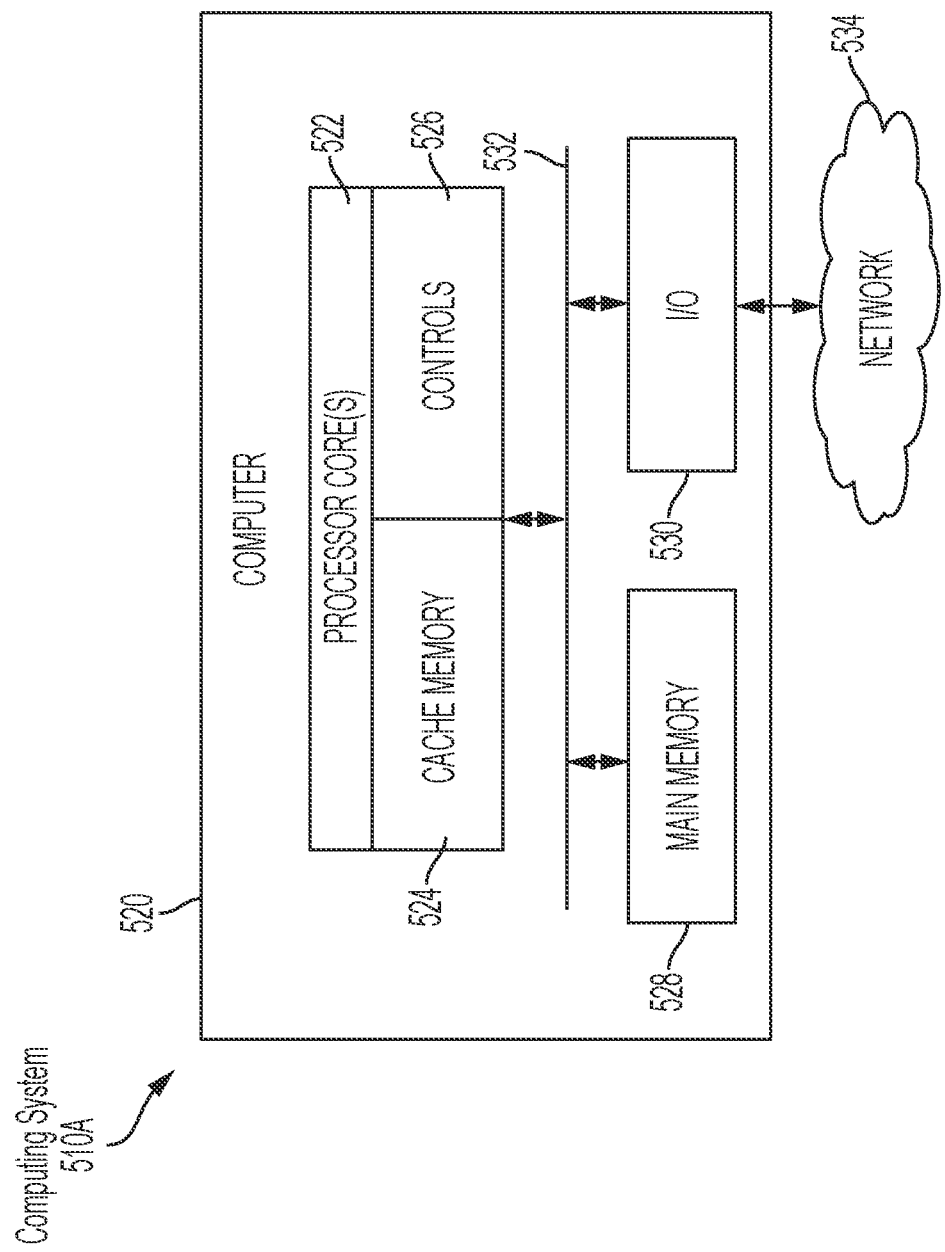
FIG. 5B depicts additional details of how a computer system of the (OSD) system shown in FIG. 5A can be implemented.

FIG. 5B depicts additional details of how the computer system 510 of the computer-based OSD system 500 shown in FIG. 5A can be a computer system 510A, which can be used to implement any of the computer-based components of the various embodiments of the invention described herein. The computer system 510A includes an exemplary computing device ("computer") 520 configured for performing various aspects of the content-based semantic monitoring operations described herein in accordance aspects of the invention. In addition to computer 520, exemplary computer system 510A includes network 534, which connects computer 520 to additional systems (not depicted) and can include one or more wide area networks (WANs) and/or local area networks (LANs) such as the Internet, intranet(s), and/or wireless communication network(s). Computer 520 and additional system are in communication via network 514, e.g., to communicate data between them.

Exemplary computer 520 includes processor cores 522, main memory ("memory") 528, and input/output component(s) 530, which are in communication via bus 532. Processor cores 522 include cache memory ("cache") 524 and controls 526. Cache 524 can include multiple cache levels (not depicted) that are on or off-chip from processor 522. Memory 528 can include various data stored therein, e.g., instructions, software, routines, etc., which, e.g., can be transferred to/from cache 524 by controls 526 for execution by processor 522. Input/output component(s) 530 can include one or more components that facilitate local and/or remote input/output operations to/from computer 520, such as a display, keyboard, modem, network adapter, etc. (not depicted).

Figure 6:
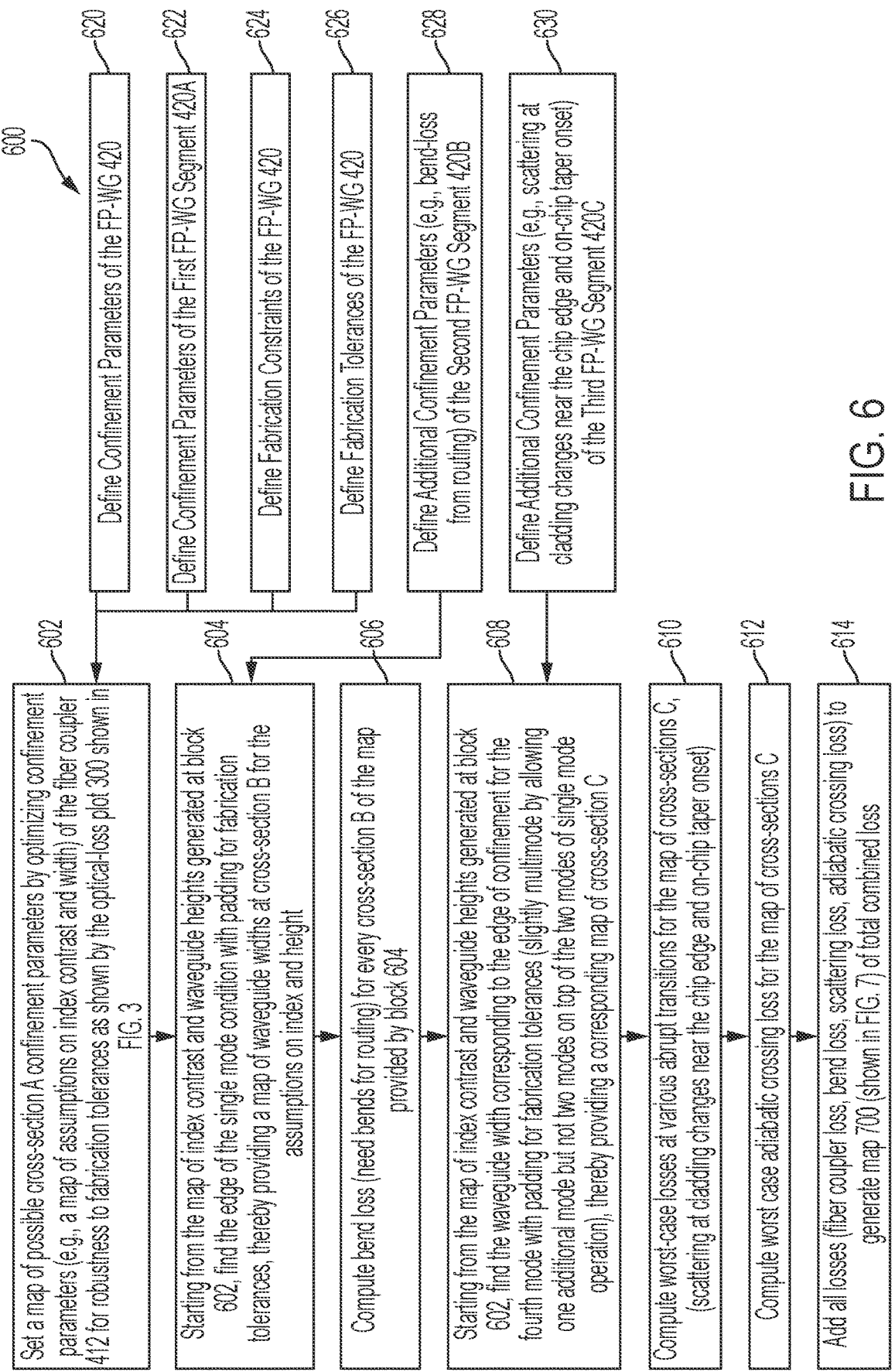
FIG. 6 depicts a method of determining the confinement parameters of the FP-WG shown in FIGS. 4A, 4B and 8 using a novel waveguide design approach according to embodiments of the invention.
Figure 7:
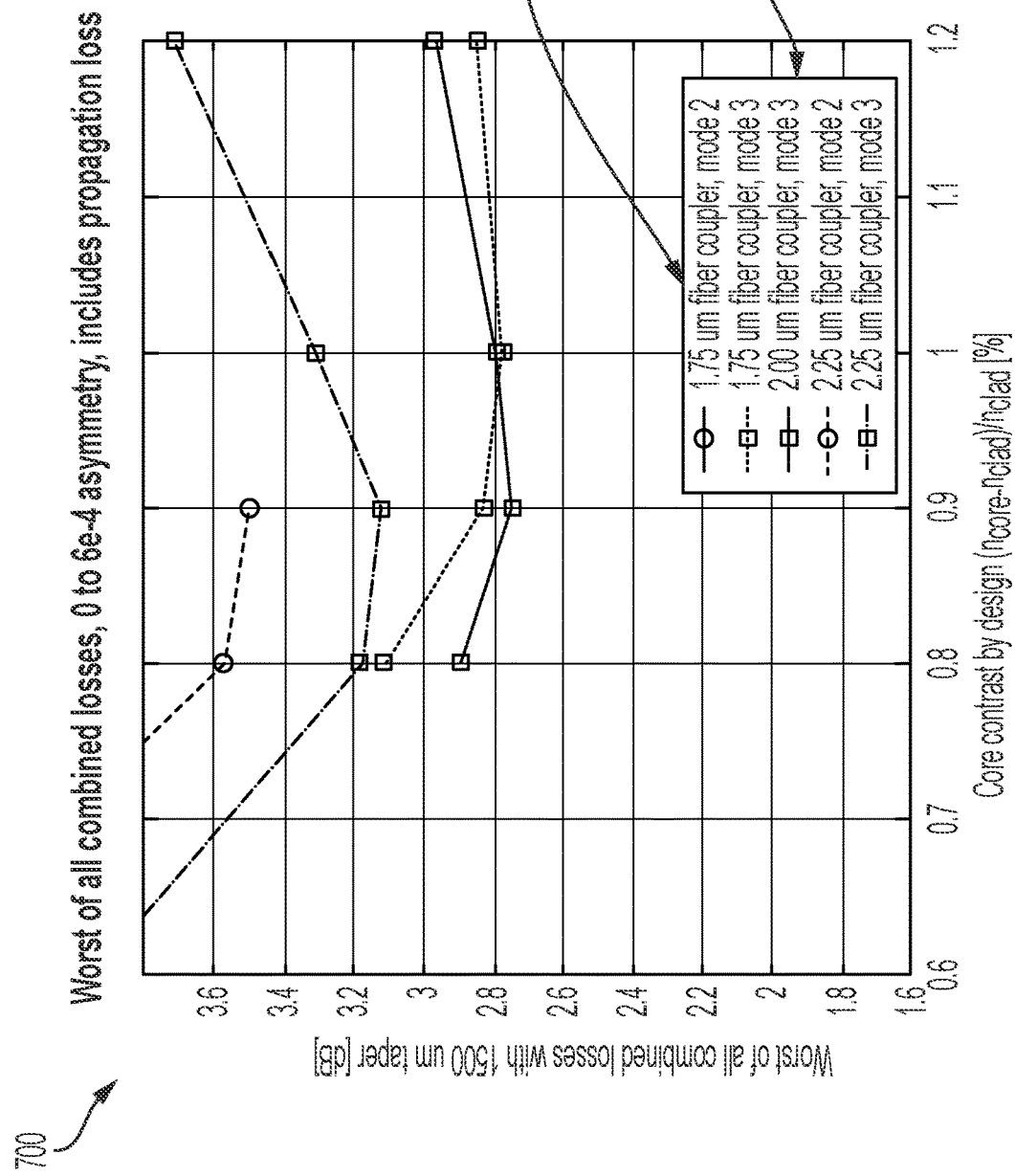
FIG. 7 depicts a combined optical-loss map illustrating aspects of the method shown in FIG. 6.

FIG. 6 depicts an example of a method 600 that can be implemented using the OSD system 500 (shown in FIG. 5A) to "globally" determine the confinement parameters of the multi-segmented FP-WG 420 (shown in FIGS. 4A and 4B) using the novel MWC-OLP waveguide design approach (represented by the optical-loss plot 300 and the asymmetric optical-loss curve 302 shown in FIG. 3A) according to embodiments of the invention, wherein the novel MWC-OLP waveguide design approach defines the confinement parameters of the FP-WG 420 based at least in part on fabrication tolerances of the FP-WG 420, and wherein the novel MWC-OLP waveguide design approach further defines the confinement parameters to, collectively, provide a "maximized worst-case optical-loss performance level (or a "best" worst-case optical-loss level) of the FP-WG 420 within the fabrication tolerances. Turning now to an overview of the method 600, each waveguide segment 420A, 420B, 420C of the FP-WG 420 is configured to incorporate "common" requirements that apply to all of the waveguide segments 420A, 420B, 420C, along with "unique" requirements that apply to (or are based on) unique features or requirements of that particular waveguide segment. For example, the fiber coupler region 412 of the FP-WG segment 420A has the unique requirement of matching with the energy distribution (or mode) of the optical fiber 410. The FP-WG segment 420B does not need to match the energy distribution (or mode) of the optical fiber 410 but instead has the unique requirement of having strong optical propagation characteristics to accommodate the Sharpe bends are present throughout the routing paths of the FP-WG segment 420B. The FP-WG segment 420C does not need to match the energy distribution of the optical fiber 410, and does not need to accommodate bends, but instead has the unique requirement of need to effectively and efficiently transfer optical energy to the photonic chip 440. In embodiments of the invention, all of the waveguide segments 420A, 420B, 420C have the common requirement of being robust to changes in waveguide parameters that result from fabrication tolerances of the FP-WG 420. In embodiments of the invention, all of the waveguide segments 420A, 420B, 420C have the common requirement of having parameter constraints that enable layer-by-layer planar fabrication operations, which can require, for example, that the heights throughout the FP-WG 420 has to be substantially the same while the width throughout the FP-WG 420 can change. In embodiments of the invention, all of the waveguide segments 420A, 420B, 420C have the common requirement of maximizing the worst-case optical-loss performance of the FP-WG 420.

The method 600 uses the OSD system 500 (shown in FIG. 5A) to generate initial sets of confinement parameters that take into account the unique requirements of each waveguide segment 420A, 420B, 420C. However, the initial sets of confinement parameters define waveguide cross-sections A, B, C that can be effective for one waveguide segment but not another. For example, the initial sets of confinement parameters can define waveguide cross-sections A and C that are effective for the FP-WG segment 420A but not very effective for the FP-WG segment 420C. Accordingly, the method 600 uses the OSD system 500 to perform a "global" optimization across the waveguide segments 420A, 420B, 420C by combining the optical-loss performance from the initial sets of confinement parameters and generating "combined-loss" optimzation maps (e.g., map 700 shown in FIG. 7) that map the initial sets of confinement parameters over a large parameter space. The method 600 is configured to take into account various causes of optical loss, including but not limited to optical propagation loss, measured in decibels per unit of propagation length, which is due to waveguide material absorption and imperfections in the patterning of the waveguide core and cladding; bend loss, which is radiation of guided light in waveguide bends; and transition loss, which is the loss induced by changes in the waveguide core or cladding cross-section (e.g., abrupt changes and smooth changes, such as adiabatic waveguide tapers). Transition loss can be a significant source of optical loss when variations in the speed and size of optical modes in routing components are notable such as in going from large optical fiber modes (e.g., about 10 microns) to small on-chip waveguide modes (e.g., about ½ micron). The method 600 uses the OSC system 500 to evaluate the combined-loss optimzation maps to identify the confinement parameters that work well for all of the waveguide segments 420A, 420B, 420C. As an example, for a cladding height and an index contrast that are determined for the initial sets of confinement parameters, the combined-loss optimization maps are generated and used to identify the range of widths that will maximize optical-loss performance for FP-WG segments 420A, 420B, and 420C within a range of fabrication tolerances of the FP-WG 420. More specifically, the method 600 optimizes the width for each set of explored combined confinement parameters to achieve a representative total optical-loss at each confinement parameter space point.

Turning now to a more detailed description of the method 600, as shown in FIG. 6, the method 600 begins at block 602 by optimizing the optical fiber coupler region 412 (shown in FIG. 4A) for robustness to fabrication tolerances 303 (shown in FIG. 3) taking into account the confinement parameters, fabrication constraints, and fabrication tolerances shown in blocks 620, 622, 624, 626. Block 602 is performed for a map of assumptions on index contrast and the width of the fiber coupler region 412. Because the minimum waveguide width is a constraint in many layer-by-layer planar waveguide fabrication processes, embodiments of the invention are configured to set a width and optimize for the height, thus providing design clarity for various fabrication capabilities and setting a map of possible confinement parameters of cross-section A. Block 604 starts from the map of index contrast and waveguide heights generated at block 602 and finds the edge of the single mode condition with padding for fabrication tolerances, taking into account the additional confinement parameter requirements of block 628. This will provide a map of waveguide widths at cross-section B for the assumptions on index and height. Block 606 computes bend loss for every cross-section B of the map generated at block 602 to account for the optical loss that results from the bends that are needed in the FP-WG waveguide segment 420B for routing. At block 608, starting from the map of index contrast and waveguide heights, the waveguide width corresponding to the edge of confinement for the fourth mode is found with padding for fabrication tolerances (e.e., result is a slightly multimode waveguide by allowing one additional mode but not two modes on top of the two modes of single mode operation), and by taking into account the additional confinement parameters of block 630. Thus, block 608 sets a corresponding map of cross-section C. Block 610 computes the worst-case optical losses at various abrupt waveguide transitions for the map of cross-sections C, (scattering at cladding changes near the chip edge and on-chip taper onset). Block 612 computes worst-case adiabatic crossing loss for the map of cross-sections C. Block 614 adds all losses (fiber coupler loss (cross-section A), bend loss (cross-section B), scattering loss from cladding transitions (cross-section C), adiabatic crossing loss (cross-section C) and propagation loss (all cross-sections) to generate a map of total combined loss, an example of which is shown as the combined optical-loss optimization map 700 (shown in FIG. 7) for an exemplary subset. More specifically, the combined-loss optimization map 700 is a 3D graphs that shows the worst-case loss along the vertical the y-axis, along with a function of the index contrast on the x-axis. The various curves on the map 700 represent the effective height of the waveguide 420. The various designs are defined by the choice of fiber coupler width, which in turn provides the waveguide height throughout. The impact of the choice of a strictly single-mode or slightly multi-mode cross-section 420C is also shown. Mode confinement consideration determine the rest of the design.

Figure 8:
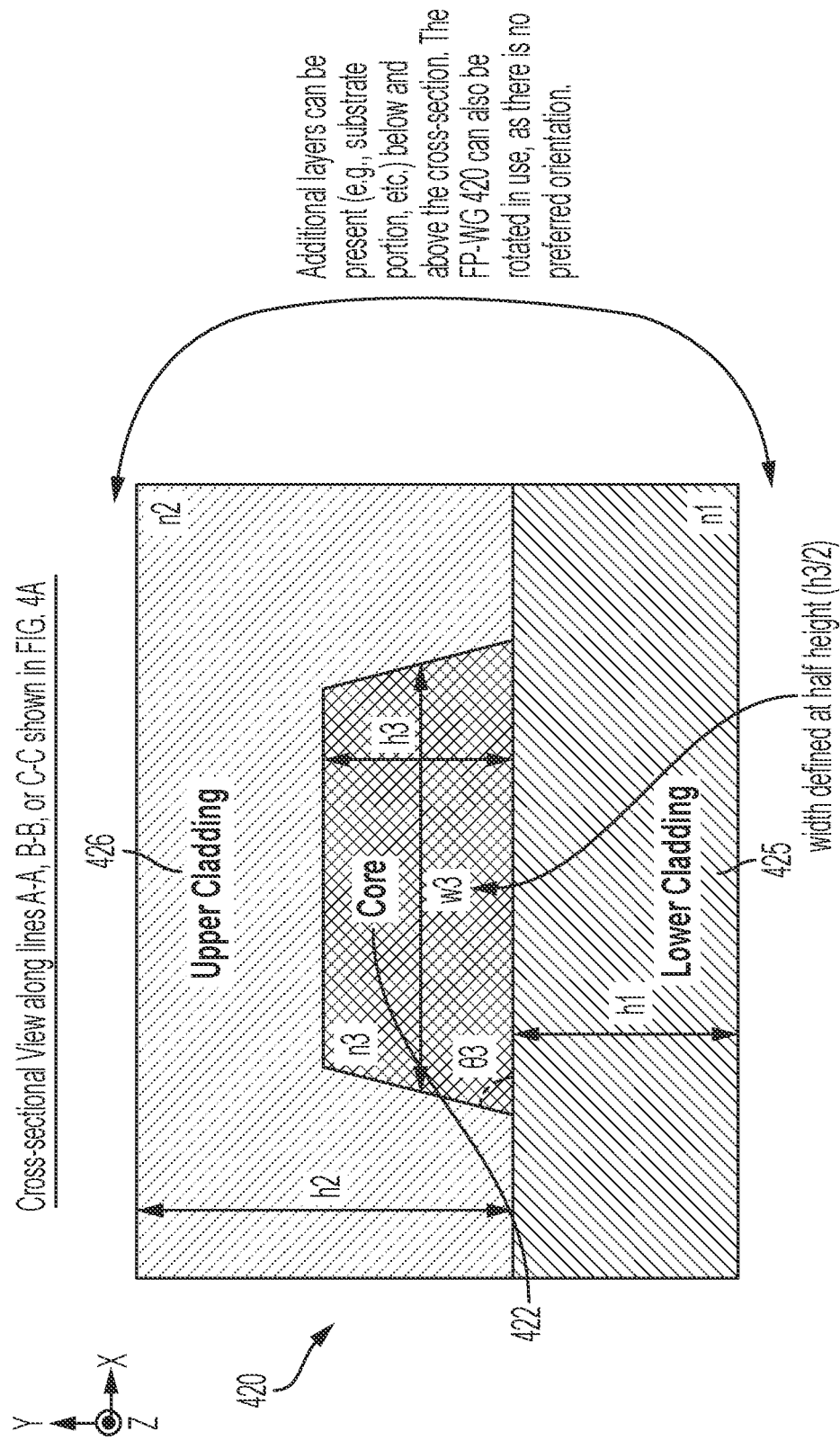
FIG. 8 depicts a cross-sectional view of the FP-WG shown in FIGS. 4A and 4B, taken along lines A-A, B-B, or C-C shown in FIG. 4A.

FIG. 8 depicts a cross-sectional view of the FP-WG 420 shown in FIGS. 4A and 4B, taken along lines A-A, B-B, or C-C shown in FIG. 4A. The FP-WG 420 includes a core 422, a lower cladding 425, and an upper cladding 426, configured and arranged as shown. In accordance with aspects of the invention, a MWC-OLP waveguide design approach (e.g., method 600 shown in FIG. 6) was used to select the confinement parameters h1, n1, h2, n2, h3, w3, Θ3, n3 to maximize a worst-case optical-loss performance of the FP-WG 420 within the waveguide's fabrication tolerance window. In accordance with aspects of the invention, the confinement parameters h1, n1, h2, n2, h3, w3, Θ3, n3 appreciate and take into account the asymmetric impact that the confinement parameters h1, n1, h2, n2, h3, w3, Θ3, n3 have on optical-loss performance and worst-case optical-loss performance in that the confinement parameters h1, n1, h2, n2, h3, w3, Θ3, n3 do not attempt to maximize, and do not consider, the impact that the selected and defined confinement parameters h1, n1, h2, n2, h3, w3, Θ3, n3 have on peak optical-loss performance of the FP-WG 420. In some aspects of the invention, the confinement parameters h1, n1, h2, n2, h3, w3, Θ3, n3 are defined based at least in part on fabrication tolerances of the FP-WG 420, and based at least in part on minimizing the impact that the fabrication tolerances have on the worst-case optical-loss performance of the FP-WG 420. Hence, the FP-WG 420 having the confinement parameters h1, n1, h2, n2, h3, w3, Θ3, n3 in accordance with aspects of the invention are robust to variations in fabrication tolerances in that the novel confinement parameters h1, n1, h2, n2, h3, w3, Θ3, n3 make the FP-WG 420 less susceptible to variations in the worst-case optical-loss performance of the FP-WG 420 over a range of waveguide fabrication tolerances.

The novel flexible waveguide confinement parameters h1, n1, h2, n2, h3, w3, Θ3, n3 are further configured to enable the FP-WG 420 to be fabricated using known layer-by-layer planar fabrication techniques. More specifically, known layer-by-layer planar fabrication operations used to fabricate the FP-WG 420 dictate that the FP-WG 420 have a substantially uniform height (h1 plus h2), cladding refractive index (n1, n2), and core refractive index (n3) throughout the length of the FP-WG 420. Hence, in accordance with aspects of the invention, the height, cladding refractive index, and core refractive index of the FP-WG 420 are defined to maximize the worst-case optical-loss performance of the flexible waveguide while also remaining substantially uniform throughout the length of the FP-WG 420 to enable the layer-by-layer planar fabrication operations. Additionally, in accordance with aspects of the invention, the fabrication constraints placed on the confinement parameters h1, n1, h2, n2, h3, w3, Θ3, n3 can include fabrication capabilities that limit the set the minimum width of the FP-WG 420. Hence, in accordance with aspects of the invention, the width w3 of the core 422 is defined to maximize the worst-case optical-loss performance of the FP-WG 420 while also maintaining a minimum width w3 dictated by the minimum feature size constraints of the relevant layer-by-layer planar fabrication processes used to form the FP-WG 420.

Figure 9:
FIG. 9 depicts a table showing confinement parameters and ranges of confinement parameters of the cross-sectional view of the FP-WG shown in FIG. 8, taken along line A-A of the FP-WG shown in FIG. 4A, wherein the confinement parameters and ranges of confinement parameters are determined in accordance with the method shown in FIG. 6.

FIG. 9 depicts a table 900 showing confinement parameters and ranges of confinement parameters of the cross-sectional view of the FP-WG 420 shown in FIG. 8, taken along line A-A of the FP-WG 420 shown in FIG. 4A, wherein the confinement parameters and ranges of confinement parameters are determined in accordance with the method 600 shown in FIG. 6.

FIG. 10 depicts a table 1000 showing confinement parameters and ranges of confinement parameters of the cross-sectional view of the FP-WG 420 shown in FIG. 8, taken along line B-B of the FP-WG shown in FIG. 4A, wherein the confinement parameters and ranges of confinement parameters are determined in accordance with the method 600 shown in FIG. 6.

FIG. 11 depicts a table 1100 showing confinement parameters and ranges of confinement parameters of the cross-sectional view of the FP-WG 420 shown in FIG. 8, taken along line C-C of the FP-WG 420 shown in FIG. 4A, wherein the confinement parameters and ranges of confinement parameters are determined in accordance with the method 600 shown in FIG. 6.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. An optical waveguide structure having waveguide dimensions that are within a range of fabrication tolerances, the optical waveguide structure comprising:
   a multi-segmented optical waveguide comprising:
      a first waveguide segment comprising a set of first waveguide segment confinement parameters;
      a second waveguide segment communicatively coupled to the first waveguide segment and configured to route optical data through a routing path having bends, the second waveguide segment comprising a set of second waveguide segment confinement parameters; and
      a third waveguide segment communicatively coupled to the second waveguide segment and comprising a set of third waveguide segment confinement parameters;
   wherein the multi-segmented optical waveguide is configured to guide optical data according to an asymmetric optical-loss performance curve that is substantially asymmetrical with respect to a peak optical-loss performance level of the asymmetric optical-loss performance curve;
   wherein the asymmetric optical-loss performance curve comprises a plot of:
      the set of first waveguide segment confinement parameters, the set of second waveguide segment confinement parameters, and the set of third waveguide segment confinement parameters on a first axis; and
      a level of optical-loss performance that results from the set of first waveguide segment confinement parameters, the set of second waveguide segment confinement parameters, and the set of third waveguide segment confinement parameters on a second axis;
   wherein the set of first waveguide segment confinement parameters, the set of second waveguide segment confinement parameters, and the set of third waveguide segment confinement parameters are each determined based at least in part on the range of fabrication tolerances; and
   wherein the set of first waveguide segment confinement parameters, the set of second waveguide segment confinement parameters, and the set of third waveguide segment confinement parameters are configured to, collectively, provide the asymmetric optical-loss performance curve with a predetermined worst-case optical-loss performance level within the range of fabrication tolerances.

2. The structure of claim 1, wherein:
   the multi-segmented optical waveguide further comprises a multi-segmented core and a multi-segmented cladding;
   the first waveguide segment comprises:
      a first core segment of the multi-segmented core; and
      a first cladding segment of the multi-segmented cladding;

the second waveguide segment comprises:
  a second core segment of the multi-segmented core; and
  a second cladding segment of the multi-segmented cladding;
the third waveguide segment comprises:
  a third core segment of the multi-segmented core; and
  a third cladding segment of the multi-segmented cladding;
the first cladding segment comprises a top first cladding segment region and a bottom first cladding segment region;
the second cladding segment comprises a top second cladding segment region and a bottom second cladding segment region; and
the third cladding segment comprises a top third cladding segment region and a bottom third cladding segment region.

3. The structure of claim 2, wherein:
the first core segment comprises a first core segment sidewall that forms a predetermined first core segment angle with respect to a first core segment bottom surface;
the second core segment comprises a second core segment sidewall that forms a predetermined second core segment angle with respect to a second core segment bottom surface; and
the third core segment comprises a third core segment sidewall that forms a predetermined third core segment angle with respect to a third core segment bottom surface.

4. The structure of claim 3, wherein the set of first core segment confinement parameters comprises:
  a length dimension of the first waveguide segment that is greater than or equal to about 1 um;
  a bottom first cladding segment refractive index that is within a range from about 1.49 to about 1.54;
  a first core segment refractive index that is within a range from about 1.007 to 1.008 times the bottom first cladding segment refractive index;
  a top first cladding segment refractive index that is about ±0.0006 of the bottom first cladding segment refractive index;
  the predetermined first core segment angle that is within a range from about 30 degrees to about 150 degrees;
  a first core segment height dimension that is within a range from about 2.4 microns to about 4.1 microns;
  a first core segment width dimension that is within a range from about 1.75 microns to about 2.25 microns;
  a bottom first cladding segment region height dimension that is within a range from about 5 microns to about 5000 microns; and
  a top first cladding segment region height dimension that is within a range from about 5 microns to about 5000 microns.

5. The structure of claim 4, wherein the set of first waveguide segment confinement parameters is the same as the set of second waveguide segment confinement parameters except that a range of second core segment width dimensions in the set of second waveguide segment confinement parameters is different than the range of first core segment width dimensions.

6. The structure of claim 5, wherein the range of second core segment width dimensions comprises from about 4.0 microns to about 5.1 microns.

7. The structure of claim 5, wherein the range of second core segment width dimensions comprises from about 4.2 microns to about 5.1 microns.

8. The structure of claim 4, wherein the set of first waveguide segment confinement parameters is the same as the set of third waveguide segment confinement parameters except that:
  a range of third core segment width dimensions in the set of third waveguide segment confinement parameters is different than the range of first core segment width dimension; and
  a range of top third cladding segment region refractive indices in the set of third waveguide segment confinement parameters is different than the range of top first cladding segment region refractive indices.

9. The structure of claim 8, wherein the range of first core segment width dimensions comprises from about 1.75 microns to about 2.25 microns.

10. The structure of claim 9, wherein the range of third core segment width dimensions comprises from about 5.7 microns to about 8.4 microns.

11. The structure of claim 10, wherein the range of top first cladding segment region refractive indices comprises from a minimum refractive index of the bottom first cladding region ±0.0006 to a maximum refractive index of the bottom first cladding region ±0.0006.

12. The structure of claim 11, wherein the range of top third cladding segment region refractive indices comprises from the minimum refractive index of the bottom first cladding region minus 0.001 to the maximum refractive index of the bottom first cladding region multiplied by about 1.008.

13. The structure of claim 12, wherein the minimum refractive index of the bottom first cladding region comprises about 1.49.

14. The structure of claim 13, wherein the maximum refractive index of the bottom first cladding region comprises about 1.54.

15. The structure of claim 14, wherein the range of first core segment width dimensions comprises from about 1.75 microns to about 2.25 microns.

16. The structure of claim 15, wherein the range of third core segment width dimensions comprises from about 6.6 microns to about 7.9 microns.

17. The structure of claim 16, wherein the range of top first cladding segment region refractive indices comprises from a minimum refractive index of the bottom first cladding region ±0.0006 to a maximum refractive index of the bottom first cladding region ±0.0006.

18. The structure of claim 17, wherein the range of top third cladding segment region refractive indices comprises from the minimum refractive index of the bottom first cladding region minus 0.001 to a maximum refractive index of a third core segment.

19. The structure of claim 18, wherein the minimum refractive index of the bottom first cladding region comprises about 1.50.

20. The structure of claim 19, wherein the maximum refractive index of the bottom first cladding region comprises about 1.52.

* * * * *